(12) United States Patent
Nishio et al.

(10) Patent No.: US 8,605,614 B2
(45) Date of Patent: Dec. 10, 2013

(54) POWER HEAD ROOM REPORTING METHOD AND MOBILE STATION DEVICE

(75) Inventors: Akihiko Nishio, Kanagawa (JP); Daichi Imamura, Kanagawa (JP); Atsushi Sumasu, Kanagawa (JP); Takashi Iwai, Miyagi (JP)

(73) Assignee: Panasonic Corporation, Osaka (JP)

( * ) Notice: Subject to any disclaimer, the term of this patent is extended or adjusted under 35 U.S.C. 154(b) by 238 days.

(21) Appl. No.: 12/997,845

(22) PCT Filed: Jun. 22, 2009

(86) PCT No.: PCT/JP2009/002825
§ 371 (c)(1),
(2), (4) Date: Dec. 13, 2010

(87) PCT Pub. No.: WO2009/157169
PCT Pub. Date: Dec. 30, 2009

(65) Prior Publication Data
US 2011/0164519 A1    Jul. 7, 2011

(30) Foreign Application Priority Data

Jun. 23, 2008 (JP) .................................. 2008-163278

(51) Int. Cl.
*H04L 1/00* (2006.01)
*H04L 12/26* (2006.01)

(52) U.S. Cl.
USPC .................. 370/252; 455/127.1; 455/522

(58) Field of Classification Search
USPC .................. 455/127.1–127.5, 115.1–115.4, 455/226.1–226.4
See application file for complete search history.

(56) References Cited

U.S. PATENT DOCUMENTS

2009/0175187 A1* 7/2009 Jersenius et al. ............. 370/252
2009/0191910 A1* 7/2009 Athalye et al. ............... 455/522

FOREIGN PATENT DOCUMENTS

WO    2008/052195    5/2008

OTHER PUBLICATIONS

International Search Report dated Sep. 29, 2009.
(Continued)

*Primary Examiner* — Ayaz Sheikh
*Assistant Examiner* — Blanche Wong
(74) *Attorney, Agent, or Firm* — Dickinson Wright PLLC

(57) ABSTRACT

Disclosed are a control signal transmitting method and mobile terminal device capable of switching between a plurality of terminal communication modes having different maximum transmissible power values with a high degree of precision, while suppressing increases in signaling overhead. In a mobile station (100), a PHR transmission evaluating unit (115) sends, to a base station (200), power head room (PHR) information for the SC-FDMA mode or the OFDMA mode during a reporting period, and a maximum transmission power information setting unit (101) provides notification to the base station (200) of difference information between the transmission modes prior to the beginning of the reporting period. An increase in signaling overhead can be prevented because only a single set of PHR information among the information for the plurality of terminal transmission modes is reported in this way. Providing notification of difference information between the transmission modes enables the base station (200) to calculate the PHR of each of the terminal transmission modes without receiving PHR information for all of the terminal transmission modes. This therefore enables highly accurate switching among the terminal transmission modes with appropriate timing.

6 Claims, 7 Drawing Sheets

(56) References Cited

OTHER PUBLICATIONS

3GPP TSG RAN WG1 Meeting #53, "Technical proposals and considerations for LTE advanced," Panasonic, R1-081791, May 2008, pp. 1-16.

3GPP TSG-RAN WG1 #52bis, "Trigger criteria for power headroom reporting," Ericsson, R1-081535, Mar. 31-Apr. 4, 2008, pp. 1-2.

3GPP TSG RAN WG1 #51 Meeting, "Summary of Power Control E-mail Discussion," Nokia Siemens Networks, R1-074890, Nov. 2007, pp. 1-3.

3GPP TSG RAN IMT Advanced Workshop, "Technical proposals and considerations for LTE advanced," Panasonic, REV-080007, Apr. 2008, pp. 1-10.

3GPP TSG RAN WG1 Meeting #52bis, "Triggers for Power Headroom Reports in EUTRAN Uplink," Nokia Siemens Networks, et al., R1-081464, Mar. 31-Apr. 4, 2008, pp. 1-2.

Extended European Search Report dated Sep. 10, 2012.

3GPP TSG-RAN WG2 meeting #46, "PA Backoff in power headroom reporting," Qualcomm, R2-050453, Feb. 14-18, 2005, pp. 1-6.

3GPP TS 25.306 V8.3.0, "3rd Generation Partnership Project; Technical Specification Group Radio Access Network; UE Radio Access capabilities (Release 8)," May 2008, pp. 1-49.

\* cited by examiner

MAXIMUM TRANSMISSION POWER INFORMATION
(POWER CLASS INFORMATION)

| POWER CLASS | MAXIMUM POWER |
|---|---|
| 1 | 19dBm |
| 2 | 21dBm |
| 3 | 23dBm |
| 4 | 25dBm |

DIFFERENCE INFORMATION
(BACK-OFF CLASS INFORMATION)

| BACK-OFF CLASS | BACK-OFF |
|---|---|
| 1 | 0dB |
| 2 | 1dB |
| 3 | 2dB |
| 4 | 3dB |

FIG.6

| CLASS | MAXIMUM POWER | BACK-OFF |
|---|---|---|
| 1 | 19dBm | 0dB |
| 2 | 19dBm | 2dB |
| 3 | 21dBm | 0dB |
| 4 | 21dBm | 2dB |
| 5 | 23dBm | 1dB |
| 6 | 23dBm | 3dB |
| 7 | 25dBm | 1dB |
| 8 | 25dBm | 3dB |

FIG.7

POWER HEAD ROOM REPORTING METHOD AND MOBILE STATION DEVICE

TECHNICAL FIELD

The present invention relates to a power headroom reporting method of a mobile station that switches between a plurality of mobile station transmission modes having different maximum transmissible power values when transmitting, and a mobile station apparatus that switches between that plurality of mobile station transmission modes when transmitting an uplink signal to a base station.

BACKGROUND ART

In LTE-Advanced, an improved version of 3GPP LTE (3rd Generation Partnership Project Long Term Evolution), hybrid transmission, in which switching is performed between SC-FDMA (Single Carrier-Frequency Division Multiple Access) and OFDMA (Orthogonal Frequency Division Multiple Access) is performed in an uplink, has been investigated (see Non-Patent Literature 1, for example).

An advantage of OFDMA is that more flexible frequency resource allocation is possible than in the case of SC-TDMA, and therefore frequency scheduling gain is obtained. Thus, OFDMA enables throughput performance to be improved. On the other hand, an advantage of SC-FDMA is that PAPR (Peak-to-Average Power Ratio) denoting a ratio of peak to average power of a transmission signal, and CM (Cubic Metric), are smaller than in the case of OFDMA. Consequently, if power amplifiers with the same maximum transmission power specification are used for SC-FDMA and OFDMA, power amplifier back-off necessary for transmitting a transmission signal without distortion can be made smaller in the case of SC-FDMA. Thus, SC-FDMA can increase actually transmissible maximum power, enabling coverage performance to be improved.

Hybrid transmission enables the respective above advantages to be obtained by switching adaptively between SC-FDMA and OFDMA according to the communication environment of a mobile station.

Investigation has been carried out into having control of switching between SC-FDMA and OFDMA performed by a base station based on power headroom (hereinafter referred to as "PHR") information indicating a margin of power (possible increase in power) of the transmission power of a mobile station. Non-Patent Literature 1 describes applying OFDMA to a mobile station with a PHR margin because transmission power is low, and applying SC-FDMA to a mobile station with no PHR margin because transmission power is high.

The PHR definition and transmitting method investigated in LTE will now be described. With LTE, a mobile station transmits PHR by means of a data channel in order for PHR to be used when a base station performs transmission power control, MCS (Modulation and channel Coding Scheme) control, and transmission bandwidth control. Non-Patent Literature 2 includes a PHR definition and PHR transmission conditions according to equation 1.

$$PHR = 10 \log_{10}(P_{MAX}) - (10 \log_{10} M + P_0 + \alpha PL + \Delta_{MCS} + f(\Delta_i))$$ (Equation 1)

Here, PHR denotes power headroom [dB], $P_{MAX}$ denotes maximum transmission power [mW], M denotes an allocated number of frequency resource blocks, $P_0$ denotes an offset (a parameter signaled from a base station) [dB], PL denotes a path loss level [dB], α denotes a weighting coefficient for path loss, $\Delta_{MCS}$ denotes an MCS-dependent offset, and $f(\Delta_i)$ denotes a transmission power control value subject to closed-loop control.

When a mobile station moves, path loss fluctuates, and therefore PHR fluctuates temporally. Consequently, it is necessary for a mobile station to report PHR to a base station at a predetermined period or when a predetermined condition is satisfied. Non-Patent Literature 2 discloses reporting of PHR to a base station by a mobile station if PHR is Y [dB] or below or if path loss changes by X [dB],
and also describes reporting of PHR at N-frame intervals (where Y, X, and N are parameters).

CITATION LIST

Non-Patent Literature
[NPL 1] Panasonic, REV-080007, "Technical proposals and considerations for LTE advanced" 3GPP TSG RAN 1MT Advanced Workshop, Shenzhen, China, Apr. 7-8, 2008
[NPL 2] Nokia Siemens Networks, Nokia, R1-081464, "Triggers for Power Headroom Reports in EUTRAN Uplink" 3GPP TSG RAN WG1 Meeting #52bis, Shenzhen, China, 31 Mar.-4 Apr. 2008

SUMMARY OF INVENTION

Technical Problem

Maximum transmissible power in SC-FDMA and OFDMA does not only differ between the two, but also differs for each mobile station. Therefore, in order for the transmission mode of a mobile station to be switched between SC-FDMA and OFDMA with a high degree of precision, it is necessary for a base station to know both SC-FDMA PHR and OFDMA PHR.

Knowledge of SC-FDMA and OFDMA PHRs by a base station can be achieved by having a mobile station report both SC-FDMA and OFDMA PHRs to the base station.

However, if both these PHRs are reported, the amount of reporting-related information is doubled compared with a 3GPP LTE system in which only SC-FDMA is employed. Control information overhead increases accordingly, resulting in a problem of degradation of data throughput.

Also, if only PHR relating to the current transmission mode is reported in order to prevent an increase in overhead, the base station can only obtain either SC-FDMA PHR or OFDMA PHR in one report. Therefore, in this case, the base station cannot switch between SC-MDMA and OFDMA at appropriate timing based on PHR.

It is an object of the present invention to provide a control signal transmitting method and mobile station apparatus that enable switching to be performed between a plurality of mobile station transmission modes having different maximum transmissible power values with a high degree of precision, while suppressing an increase in signaling overhead.

Solution to Problem

A power headroom reporting method of the present invention is a power headroom reporting method of a mobile station that switches between a plurality of mobile station transmission modes having different maximum transmissible power values when transmitting, and has: a step of transmitting PHR information of one of the plurality of mobile station transmission nodes to the base station in a reporting period; and a step of transmitting difference information relating to the maximum values between mobile station transmission modes to the base station before the reporting period starts.

A mobile station apparatus of the present invention is a mobile station apparatus that switches between a plurality of mobile station transmission nodes having different maximum transmissible power values when transmitting an uplink signal to a base station, and has: a reporting section that reports PHR information of one of the plurality of mobile station transmission modes having different maximum transmissible power values to the base station in a reporting period; and a notification section that notifies the base station of difference information relating to the maximum values between mobile station transmission modes before the reporting period starts.

Advantageous Effects of Invention

According to the present invention, a power headroom reporting method and mobile station apparatus can be provided that enable switching to be performed between a plurality of mobile station transmission modes having different maximum transmissible power values with a high degree of precision, while suppressing an increase in signaling overhead.

BRIEF DESCRIPTION OF DRAWINGS

FIG. 6 is a drawing showing a maximum transmission power information table and difference information table; and FIG. 7 is a drawing showing a table used for reporting maximum transmission power information and difference information according to Embodiment 2.

DESCRIPTION OF EMBODIMENTS

The present inventors have found that a difference in power headroom between a plurality of mobile station apparatuses is attributable only to the maximum transmissible power value of each transmission mode, and, while differing for each mobile station apparatus, is a fixed value in each mobile station apparatus irrespective of the transmission state. The present inventors then have found that, if difference information is reported to a base station beforehand, the base station can calculate power headroom information for all mobile station transmission modes by having only power headroom information for one mobile station transmission mode reported by a mobile station apparatus, and so arrived at the present invention.

Now, embodiments of the present invention will be described in detail with reference to the accompanying drawings. In the embodiments, identical configuration elements are assigned the same reference codes, and duplicate descriptions thereof are omitted.

Embodiment 1

Figure 1:
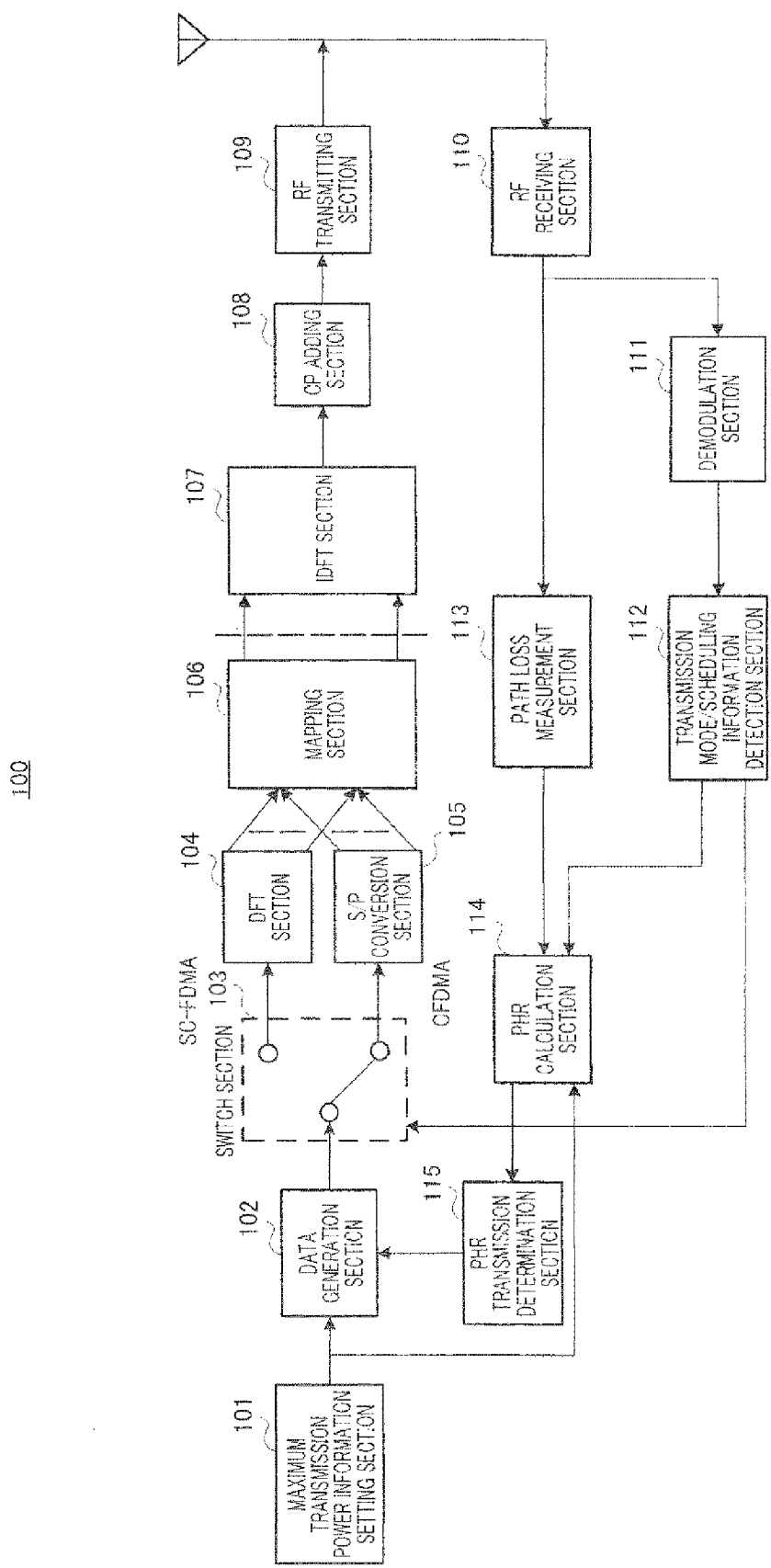
FIG. 1 is a block diagram showing the configuration of a mobile station apparatus according to Embodiment 1 of the present invention.

FIG. 1 is a block diagram showing the configuration of mobile station apparatus (hereinafter referred to simply as "mobile station") 100 according to Embodiment 1 of the present invention. Mobile station 100 is configured to allow support for 3GPP LTE-Advanced.

In FIG. 1, mobile station 100 has maximum transmission power information setting section 101, data generation section 102, switch section 103, DFT section 104, S/P (serial/parallel) conversion section 105, mapping section 106, IDFT section 107, CP adding section 108, RF transmitting section 109, RF receiving section 110, demodulation section 111, transmission mode/scheduling information detection section 112, path loss measurement section 113, PHR calculation section 114, and PHR transmission determination section 115.

Maximum transmission power information setting section 101 sets the maximum transmission power used by mobile station 100 in the cell or system to which it currently belongs. This maximum transmission power is the maximum value of power that it is possible for mobile station 100 to transmit in that cell or system. Maximum transmission power is set according to the transmission frequency, number of antennas, or the like, of mobile station 100. Maximum transmission power information setting section 101 outputs set maximum transmission power information (power class information) to data generation section 102 and PHR calculation section 114.

If mobile station 100 belongs to a cell or system in which a plurality of mobile station transmission modes having different maximum transmission power can be utilized, maximum transmission power information setting section 101 outputs difference information relating to maximum transmission power between transmission modes to data generation section 102 together with maximum transmission power information. Difference information relating to maximum transmission power between transmission modes is equivalent to difference information relating to power headroom (PHR) between transmission modes. Maximum transmission power information setting section 101 outputs difference information to data generation section 102 so that difference information is transmitted before a power headroom information reporting period described later herein starts. In this way, a base station described later herein is notified of difference information.

Figure 2:
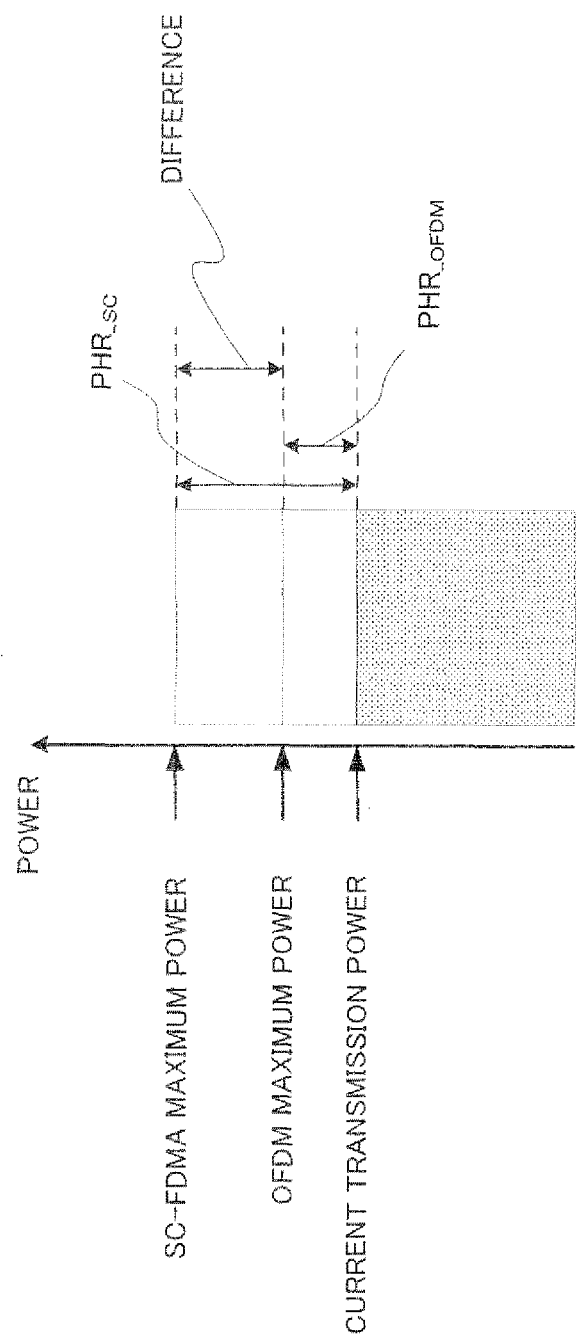
FIG. 2 is a drawing for explaining difference information.

Here, a plurality of mobile station transmission modes having different maximum transmission power are an SC-FDMA mode and an OFDMA mode. In this case, difference information is the difference between SC-FDMA mode maximum power and OFDMA mode maximum power (see FIG. 2).

Figure 3:
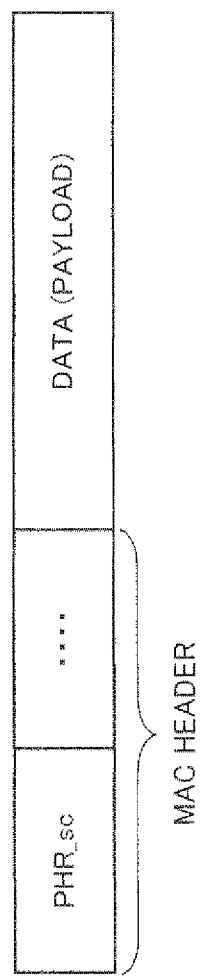
FIG. 3 is a drawing provided to explain a power headroom information report format.

Data generation section 102 generates data that is transmitted by mobile station 100, and outputs the generated transmission data to switch section 103. When PHR information is received from PHR transmission determination section 115 (that is, when PHR information is to be reported to a base station), data generation section 102 includes PHR information in the transmission data as MAC information, as shown in FIG. 3. This report format is the same for 3GPP LTE and 3GPP LTE-Advanced. In this way, PHR information is reported to base station 200 described later herein.

Also, when data generation section 102 receives maximum transmission power information and difference information from maximum transmission power information setting section 101, data generation section 102 generates transmission data based on both of these pieces of information.

Switch section 103 switches the transmission mode in accordance with a command from base station 200 described later herein. Switch section 103 switches between outputting data output from data generation section 102 to DFT section 104 and outputting this data to S/P conversion section 105 based on a transmission mode information detection result from transmission mode/scheduling information detection section 112. Specifically, switch section 103 outputs data to DFT section 104 if SC-FDMA mode information is detected as transmission mode command information by transmission mode/scheduling information detection section 112, and outputs data to S/P conversion section 105 if OFDMA mode information is detected.

DFT section 104 executes DFT (Discrete Fourier Transform) processing on data output from switch section 103, and outputs the data to mapping section 106.

S/P conversion section 105 converts data output from switch section 103 from a serial sequence to a parallel sequence, and outputs this to mapping section 106.

Mapping section 106 maps data output from DFT section 104 or data output from S/P conversion section 105 onto a frequency band scheduled by base station 200 described later herein, and outputs the data to IDFT section 107. That is to say, each data symbol of data output from DFT section 104 is mapped onto an entire transmission frequency band, while each data symbol of data output from S/P conversion section 105 is mapped onto one individual subcarrier.

IDFT section 107 executes IDFT (Inverse Discrete Fourier Transform) processing on a frequency-domain signal output from mapping section 106, performs conversion to a time-domain signal, and outputs this to CP adding section 108.

CP adding section 108 copies part of the end of a frame of a signal output from IDFT section 107 as a CP (Cyclic Prefix), and adds the CP to the head of the frame. A signal to which a CP has been added is output to RF transmitting section 109.

RF transmitting section 109 executes transmission processing such as D/A conversion, amplification, and up-conversion on a signal output from CP adding section 108, and transmits the signal to base station 200 described later herein from an antenna.

RF receiving section 110 receives a signal transmitted from base station 200 described later herein via the antenna, executes reception processing such as down-conversion and A/D conversion on the received signal, and outputs the signal to demodulation section 111.

Demodulation section 111 performs equalization processing and demodulation processing on a signal output from RF receiving section 110, and outputs the demodulation result to transmission mode/scheduling information detection section 112.

Transmission mode/scheduling information detection section 112 detects scheduling information specified by base station 200 described later herein from the demodulation result. Scheduling information includes an MCS (Modulation and Coding Scheme), transmission bandwidth, and transmission power control information. The detected scheduling information is output to PHR calculation section 114.

Transmission mode/scheduling information detection section 112 also detects transmission mode command information from base station 200 described later herein from the demodulation result. Transmission mode command information includes a switching-destination transmission mode (that is, here, SC-FDMA mode information or OFDMA mode information, which transmission mode information at the switching destination). The detected transmission mode command information is output to switch section 103 and PHR calculation section 114.

Path loss measurement section 113 measures the reception level of a downlink common pilot signal for which transmission power is known included in a signal output from RF receiving section 110, and measures a downlink channel path loss level. The measured path loss level is output to PHR calculation section 114.

PHR calculation section 114 finds a data channel transmission power level based on the path loss level output from path loss measurement section 113 and scheduling information output from transmission mode/scheduling information detection section 112, and calculates PHR using equation 1. Here, PHR calculation section 114 calculates PHR of the currently selected transmission mode. The calculated PHR is output to PHR transmission determination section 115.

Periodically in a reporting period, or when a predetermined condition is satisfied, PHR transmission determination section 115 outputs PHR received from PHR calculation section 114 to data generation section 102. PHR transmission determination section 115 determines whether or not a predetermined condition for transmitting PHR has been satisfied by performing a relative size comparison between the PHR output from PHR calculation section 114 and a PHR threshold value—that is, by performing a threshold value determination. PHR transmission determination section 115 also determines whether or not a timer value counted from the previous PHR periodic transmission has reached a predetermined value. In this way, PHR information is reported to base station 200 described later herein periodically in a reporting period or when a predetermined condition is satisfied.

Figure 4:
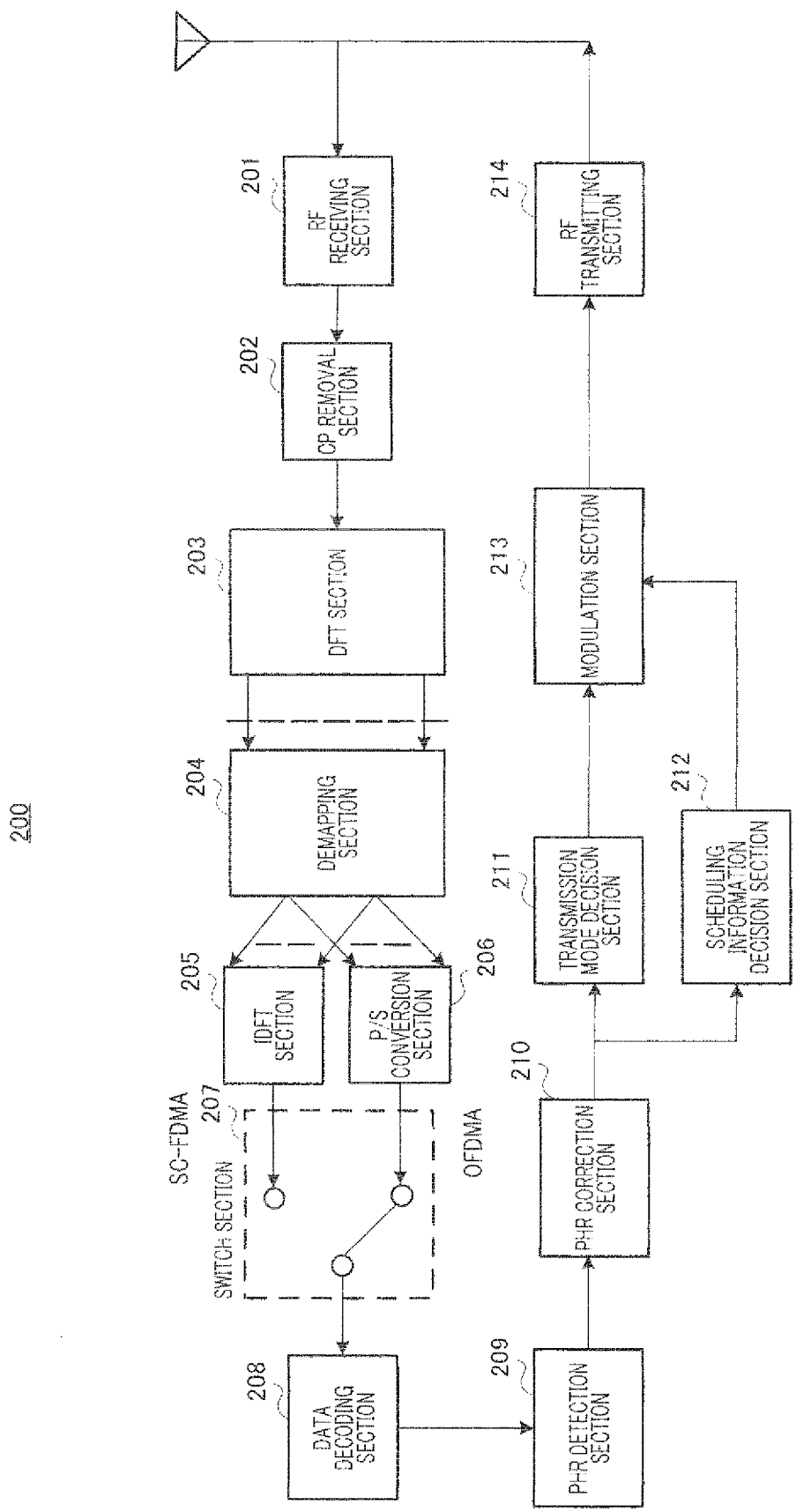
FIG. 4 is a block diagram showing the configuration of a base station apparatus according to Embodiment 1 of the present invention.

FIG. 4 is a block diagram showing the configuration of base station apparatus (hereinafter referred to simply as "base station") 200 according to Embodiment 1 of the present invention. Base station 200 is configured to allow support for 3GPP LTE-Advanced.

In FIG. 4, base station 200 has RF receiving section 201, CP removal section 202, demapping section 204, IDFT section 205, P/S conversion section 206, switch section 207, data decoding section 208, PHR detection section 209, PHR correction section 210, transmission mode decision section 211, scheduling information decision section 212, modulation section 213, and RF transmitting section 214.

RF receiving section 201 receives a signal transmitted from mobile station 100 via an antenna, executes reception processing such as down-conversion and A/D conversion on the received signal, and outputs the signal to CP removal section 202.

CP removal section 202 removes a CP component of a signal output from RF receiving section 201, and outputs a signal from which the CP component has been removed to DFT section 203.

DFT section 203 executes DFT processing on a signal output from CP removal section 202, and outputs a signal that has been converted from the time domain to the frequency domain to demapping section 204.

Demapping section 204 extracts received data from a frequency band scheduled by base station 200 in a frequency-domain signal output from DFT section 203, and outputs the extracted received data to IDFT section 205 and P/S conversion section 206.

IDFT section 205 executes IDFT processing on received data output from demapping section 204, performs conversion to a time-domain signal, and outputs this to switch section 207.

P/S conversion section 206 converts received data output from demapping section 204 from a parallel sequence to a serial sequence, and outputs this to switch section 207.

Switch section 207 is switched based on a mobile station 100 transmission mode decided by transmission mode decision section 211. This switching is performed by means of control by a control section (not shown) based on a transmission mode decided by transmission mode decision section 211. By means of this switching, data output from IDFT section 205 is output to data decoding section 208 if the current transmission mode is SC-FDMA, and data output from P/S conversion section 206 is output to data decoding section 208 if the current transmission mode is OFDMA.

Data decoding section 208 decodes data output from switch section 207, and outputs the decoded data to PHR detection section 209.

PHR detection section 209 detects PHR information and difference information included in data output from data decoding section 208, and outputs the detected PHR information and difference information to PHR correction section 210.

By performing correction for PHR information reported from mobile station 100 using difference information, PHR correction section 210 calculates PHR for a transmission mode other than a transmission mode corresponding to that PHR information. Here, if SC-TDMA mode PHR is reported from mobile station 100, PHR correction section 210 calculates OFDMA mode PHR by subtracting the difference information from that reported PHR. On the other hand, if OFDMA mode PHR is reported from mobile station 100, PHR correction section 210 calculates SC-FDMA mode PHR by adding the difference information to that reported PHR.

Transmission mode decision section 211 decides transmission mode (here SC-FDMA mode or OFDMA mode) switching for a data channel for the next transmission by mobile station 100 based on SC-FDMA mode and OFDMA mode PHRs calculated by PHR correction section 210, and outputs transmission mode command information specifying the switching-destination transmission mode (the transmission mode to be switched to) to modulation section 213.

Scheduling information decision section 212 decides scheduling information such as a transmission signal MCS, allocated resource, transmission power, and so forth, based on SC-FDMA mode and OFDMA mode PHRs calculated by PHR correction section 210, together with reception quality information obtained separately. This scheduling information is output to modulation section 213.

Modulation section 213 modulates transmission data, transmission mode command information, and scheduling information, and outputs a modulated signal to RF transmitting section 214.

RF transmitting section 214 executes transmission processing such as D/A conversion, amplification, and up-conversion on a modulated signal output from modulation section 213, and transmits the signal to mobile station 100 from the antenna.

The operation of mobile station 100 and base station 200 having the above configurations will now be described.

Figure 5:
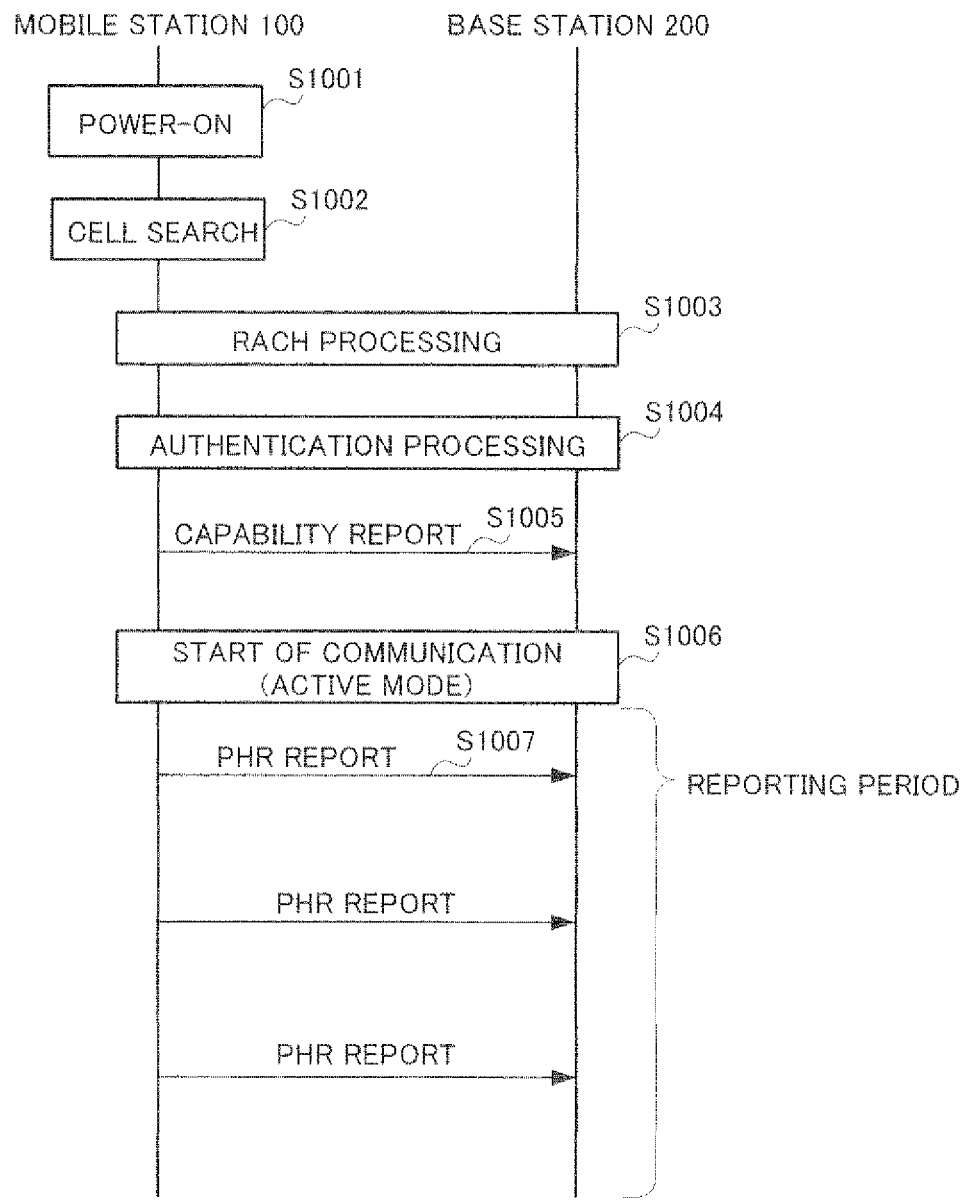
FIG. 5 is a drawing provided to explain a communication procedure between a mobile station and base station.

FIG. 5 is a drawing provided to explain a communication procedure between mobile station 100 and base station 200. It is assumed that base station 200 can use a plurality of mobile station transmission modes having different maximum transmission power.

When mobile station 100 power is switched on (step S1001), mobile station 100 performs a cell search (step S1002).

Then, when base station 200 to be accessed is decided, mobile station 100 and base station 200 perform RACH processing in step S1003, and perform authentication processing in step S1004.

When mobile station 100 and base station 200 enter a communicable state, in step S1005 mobile station 100 transmits a mobile station 100 capability (mobile station capability) report to base station 200.

That is to say, mobile station 100 reports mobile station 100 capability, such as transmission power information, number of antennas, maximum data rate, and so forth. As this transmission power information, maximum transmission power information setting section 101 of mobile station 100 reports maximum transmission power information and difference information (information on the difference between SC-FDMA mode maximum power and OFDMA mode maximum power) to base station 200. This reporting is performed by each mobile station 100. Then base station 200 holds maximum transmission power difference information for each mobile station 100.

Here, maximum transmission power information and difference information are defined by tables such as shown in FIG. 6, for example. That is to say, maximum transmission power information is classified into a plurality of power classes based on maximum power, and difference information is classified into a plurality of back-off classes based on back-off (difference). Similar tables are also held by base station 200.

Mobile station 100 notifies base station 200 of maximum transmission power information and difference information by means of power class information and back-off class information. This is notified before a PHR reporting period starts. Here, in particular, this notification is performed before mobile station 100 and base station 200 enter a communication start state (for example, active mode (also called connected mode)) in step S1006.

Then, when a PHR reporting period starts, mobile station 100 starts reporting PHR to base station 200 in step S1007. This PHR reporting is performed periodically in a reporting period, or when a predetermined condition is satisfied.

When PHR is reported, PHR correction section 210 in base station 200 calculates PHR of both modes for each mobile station 100 using previously acquired difference information.

In the above description, a case has been described in which difference information is reported during a communication procedure between mobile station 100 and base station 200 performed when mobile station 100 power is switched on. However, difference information may also be reported at a time other than when power is switched on—for example, when mobile station 100 performs handover. Also, difference information may be transferred from handover-source base station 200 to handover-destination base station 200.

As described above, according to this embodiment, periodically in a reporting period, or when a predetermined condition is satisfied, PHR transmission determination section 115 in mobile station 100 transmits either SC-FDMA mode or OFDMA mode power headroom information to base station 200, and maximum transmission power information setting section 101 notifies base station 200 of difference information between transmission modes before a power headroom information reporting period starts.

By this means, since power headroom information transmitted in a reporting period is power headroom information for one of a plurality of mobile station transmission modes, an increase in uplink signaling overhead compared with a case in which there is one mobile station transmission mode can be prevented.

Also, by having base station 200 notified of difference information between transmission modes before a reporting period, base station 200 can calculate power headroom relating to each mobile station transmission mode without receiving power headroom information relating to all mobile station transmission modes. Consequently, base station 200 can switch between mobile station transmission modes with a high degree of precision at appropriate timing, and can also give mobile station 100 a transmission power or transmission bandwidth command according to each mobile station transmission mode. By this means, mobile station 100 can transmit using appropriate transmission parameters at all times, enabling uplink throughput to be improved.

Furthermore, since one kind of power headroom information is reported in the same way as with 3GPP LTE, power headroom information can be reported using the same format as with 3GPP LTE. This makes simple system implementation possible.

A case has been described above in which PHR of the current transmission mode is reported. However, the present invention is not limited to this, and provision may also be made for SC-FDMA mode PHR to be reported irrespective of the transmission mode.

By so doing, since the PHR format (for example, the PHR range and so forth) can be shared with LTE, processing for conversion from PHR to an information bit string performed by mobile station 100 can be simplified. Also, since a PHR report trigger condition (such as PHR being Y [dB] or below, for example) can be shared with LTE, a simple system can be implemented. At this time, when the current transmission mode is OFDM mode, mobile station 100 measures OFDM mode PHR, finds SC-FDMA mode PHR by correcting the found PHR using difference information, and reports this SC-TDMA mode PHR to base station 200.

A case has been described above in which a plurality of mobile station transmission modes are an SC-TDMA mode and OFDM mode. However, the present invention is not limited to this, and, for example, a mode in which a plurality of SC-FDMA signals are transmitted at different frequencies, or a mode in which one SC-FDMA signal is transmitted placed on different frequencies (for example, clustered SC-FDMA or clustered DFT-S-OFDM) may be used rather than an OFDM mode, as long as that mode is a multicarrier transmission mode. For example, if there are a plurality of transmission modes supporting transmission in which the numbers of SC-TDMA signals are one, two, and four as a plurality of mobile station transmission modes having different maximum transmission power, mobile station 100 reports to base station 200 maximum transmission power difference information for the case of two and maximum transmission power difference information for the case of four with respect to maximum transmission power for the case of one.

Also, a MIMO transmission mode may be used as one case of a plurality of mobile station transmission modes having different maximum transmission power. Since a plurality of data streams multiplied by different weights are multiplex-transmitted from the antennas, the PAPR or CM increases in the same way as in multicarrier transmission. Therefore, a MIMO transmission mode can be treated in the same way as an OFDM mode. Furthermore, a PAPR or CM increase differs for each weight matrix—that is, precoding matrix. Therefore, mobile station 100 may report to base station 200 difference information for MIMO transmission mode maximum transmission power with respect to SC-FDMA (single-antenna transmission) mode maximum transmission power for each precoding matrix.

Embodiment 2

Embodiment 2 relates to a variation of capability (mobile station capability) reporting. The configurations of a mobile station and base station of Embodiment 2 are the same as those in Embodiment 1.

FIG. 7 shows a table used for reporting maximum transmission power information and difference information according to Embodiment 2.

In FIG. 7, mobile station performance is classified according to a combination of maximum power and back-off. That is to say, when reporting is performed using this table, mobile station (UE) performance information reported to a base station from a mobile station is defined by a combination of maximum power and back-off. Specifically, maximum transmission power information setting section 101 of mobile station 100 uses a class number matching the performance of that station in a report.

In the table shown in FIG. 7, in the combinations that define mobile station (UE) performance information, a higher power class is combined with a correspondingly higher back-off class, because, generally speaking, the greater the maximum power, the greater is the back-off required.

In this way, improbable combinations in which the power class is high and hack-off is small can be excluded. Therefore, the number of classes can be reduced, enabling the number of bits required to represent all the class identification information to be reduced. Thus, the amount of report-related signaling can be reduced. Also, only a class number need be reported, making an increase in types of control information unnecessary as compared with LTE. Therefore, a simple system can be constructed.

In the above embodiments, cases have been described by way of example in which the present invention is configured as hardware, but it is also possible for the present invention to be implemented by software.

The function blocks used in the descriptions of the above embodiments are typically implemented as LSTs, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The application of biotechnology or the like is also a possibility.

The disclosure of Japanese Patent Application No. 2008-163278, filed on Jun. 23, 2008, including the specification, drawings and abstract, is incorporated herein by reference in its entirety.

INDUSTRIAL APPLICABILITY

A power headroom reporting method and mobile station apparatus of the present invention are useful in enabling switching to be performed between a plurality of mobile station transmission modes having different maximum transmissible power values with a high degree of precision, while suppressing an increase in signaling overhead.

The invention claimed is:
1. A power headroom reporting method comprising:
transmitting power headroom information of one of a first transmission mode and a second transmission mode from a mobile station to a base station, a first maximum transmissible power of the first transmission mode being different from a second maximum transmissible power of the second transmission mode, wherein each of the first transmission mode and the second transmission mode is an uplink transmission mode from the mobile station to the base station, and each of the first maximum transmissible power and the second maximum transmissible power is an uplink transmissible power of the mobile station;

transmitting difference information indicating a difference between the first maximum transmissible power and the second maximum transmissible power to the base station before transmitting the power headroom information; and transmitting an uplink signal with the uplink transmission mode, which is determined between the first transmission mode and the second transmission mode based on the power headroom and the difference information.

2. A mobile station apparatus comprising:

a generating section that generates power headroom information of one of a first transmission mode and a second transmission mode, and that generates difference information indicating a difference between a first maximum transmissible power of the first transmission mode and a second maximum transmissible power of the second transmission mode, the first maximum transmissible power being different from the second maximum transmissible power, wherein each of the first transmission mode and the second transmission mode is an uplink transmission mode from the mobile station apparatus to a base station, and each of the first maximum transmissible power and the second maximum transmissible power is an uplink transmissible power of the mobile station apparatus; and a transmitting section that transmits the power headroom, the difference information and an uplink signal to the base station, wherein said transmitting section transmits the difference information before transmitting the power headroom, and transmits the uplink signal with the uplink transmission mode, which is determined between the first transmission mode and the second transmission mode based on the power headroom and the difference information.

3. The mobile station apparatus according to claim 2, wherein the transmitting section transmits the difference information using user equipment performance information defined by a combination of power class and difference class.

4. The mobile station apparatus according to claim 3, wherein, in the combinations that define the user equipment performance information, a higher power class is combined with a correspondingly higher difference class.

5. The mobile station apparatus according to claim 2, wherein:

the transmitting section transmits power headroom information for a transmission mode selected at a time of transmitting to the base station, and transmits the difference information before entering a communication start state with the base station.

6. The mobile station apparatus according to claim 2, wherein the first transmission mode is an SC-FDMA (Single Carrier-Frequency Division Multiple Access) mode and the second transmission mode is an OFDMA (Orthogonal Frequency Division Multiple Access) mode.

* * * * *